United States Patent [19]

MacFarlane

[11] Patent Number: 4,764,838
[45] Date of Patent: Aug. 16, 1988

[54] REGULATED ALTERNATOR WITH POSITIVE FAULT RELATED SHUT DOWN APPARATUS

[75] Inventor: Alistair A. MacFarlane, East Kilbride, Scotland

[73] Assignee: Marathon Electric Manufacturing Corp., Wausau, Wis.

[21] Appl. No.: 897,135

[22] Filed: Aug. 15, 1986

[51] Int. Cl.[4] .............................................. H02H 7/06
[52] U.S. Cl. ........................................ 361/21; 361/56; 361/57; 361/86; 361/87; 361/92; 361/94; 322/24; 290/40 B; 290/40 C
[58] Field of Search .................... 361/20, 21, 79, 86, 361/87, 92, 94, 98, 56, 57; 322/23, 24, 25, 27, 28; 290/40 B, 40 C

[56] References Cited

U.S. PATENT DOCUMENTS

| | | | |
|---|---|---|---|
| 3,042,850 | 7/1962 | Kern | 322/27 |
| 3,938,005 | 2/1976 | Cummins | 322/28 X |
| 4,096,429 | 6/1978 | Carter | 322/28 |
| 4,335,344 | 6/1982 | Gant | 322/28 X |
| 4,410,848 | 10/1983 | Frierdich | 361/20 X |

Primary Examiner—A. D. Pellinen
Assistant Examiner—Derek S. Jennings
Attorney, Agent, or Firm—Andrus, Sceales, Starke & Sawall

[57] ABSTRACT

A permanent magnet generator and rectifier is connected to the exciter of an alternator and a separate rectifier provides a D.C. voltage supply to a voltage regulator. A thyristor is connected in series with a second fuse across the exciter rectifier to short circuit the supply in series with a main external fuse. If the main fuse fails to open, the second fuse opens. The second fuse is potted in the regulators to prevent tampering. An overexcitation and a low voltage demand signal are sensed. The two signals are coupled to a NAND logic gate to produce an output shut-down signal. If either even is established and the first produces a signal, a shut-down signal is generated to a second comparator amplifier of latch circuit. A delay circuit connects the shut-down signal to a triggered oscillator for firing the thyristor. A voltage detector senses the rectified voltage on the thyristor and holds the oscillator off until an appropriate voltage exists to insure operation of the voltage regulator and the safety circuit. The oscillator develops a high peak, narrow current pulse for driving the thyristor fully on to trip one of the fuses.

20 Claims, 1 Drawing Sheet

REGULATED ALTERNATOR WITH POSITIVE FAULT RELATED SHUT DOWN APPARATUS

BACKGROUND OF THE PRESENT INVENTION

This invention relates to a regulated alternator having a positive fault related shut down apparatus to prevent damage to the alternator and/or the connected loads.

Separate alternator power supply systems are used in industry for providing of appropriate electrical power to various loads. A voltage regulator is connected in the control circuit of the alternator to establish and maintain a predetermined voltage output under varying load and operating conditions. The regulator often includes various current limit devices to minimize the current output under certain operating and voltage conditions and thereby prevent damage to the alternator and/or the interconnected loads.

In a typical system a rotating field alternator is energized with a rectified current from an exciter generator. The excitation of the exciter generator is controlled by the voltage regulator to in turn control the output of the alternator in accordance with various voltage, current and other related sensed operating parameters. The power supply for the exciter and the voltage regulator may be provided with a feedback power from the main alternator or may advantageously be powered from a separate permanent magnet generator constructed as an integrated part of the alternator assembly. For example a particularly satisfactory permanent magnet generator alternator system is shown in the co-pending application of M. Parshall entitled "Permanent Magnet Generator Apparatus" and filed on even date herewith. The system with a separate power supply insures a constant voltage supply and continued operation of the voltage regulator independently of the proper operation of the alternator.

Under certain conditions the voltage regulation system may malfunction with the alternator continuing to operate in an adverse or damaging state. Generally, an external circuit or the output of the alternator is fused to open the output circuit and positively prevent and effectively shut down the alternator under such conditions. In such systems however, the protective device may not always function for various reasons including a faulty or oversized fuse in place, or even a deliberate bypass of the fuse structure by the operating personnel which will prevent appropriate response. Further, other conditions might exist under which the regulator should have shut down the alternator but because of some internal malfunction in the regulator system, the alternator is driven to continue to provide an output, in essence, without regulation.

Thus, in a regulated alternator, regulator failure and/or a power device failure to a short circuit condition, will generally cause the regulator to create a full forcing excitation of the alternator excitation system. The maximum voltage and current is then supplied to the excitation system unless a suitable protective switching device such as a fuse, circuit breaker, or like device is activated to positively open the excitation power supply and positively shut down the alternator. The protective devices are necessarily carefully constructed and rated to permit limited full forcing excitation while establishing a tripped or open state when necessary to protect the system. The problem is made more difficult because of severe environments in which alternator power systems often operate, such as, salt, fog, vibration, various air born foreign matter and the like. Further, the protective device should be conveniently available for effective resetting if the shut down was due to a self correcting problem or after other correction of the problem. The availability however will permit the operator to by-pass the protective device in order to establish a voltage supply in spite of the failure in the regulator.

There is therefore a need for a separate monitoring system to insure shut down of the alternator under such conditions to protect the alternator as well as the loads connected to the alternator.

SUMMARY OF THE PRESENT INVENTION

The present invention is directed to an alternator shut down or desirable apparatus to positively de-energize the alternator if the voltage regulator malfunctions such as by providing excitation to the alternator with the regulator signaled to limit or prevent such alternator excitation.

In accordance with the teaching of the present invention, monitoring means are provided for detecting the presence of an excitation current flow in the presence of a current shut down signal in the regulator. If the conditions simultaneously exist a logic circuit means responds and produces an output signal which is preferably connected to positively effectively disable the alternator operation. More particularly, a switch means, such as a solid state gated switch and typically a thyristor is connected in circuit with an effective disconnect means in the energizing circuit to the alternator and positively effect a short circuit connection across the power supply in series with the disconnect means which is preferably a fuse means. The short circuit connection establishes a current level sufficient to insure opening of the fuse. If the fused system has been bypassed or a larger fuse inserted in attempt to maintain operation, the present invention in the preferred practical construction provides an internal fuse within the regulator. If the external fuse does not blow, the internal fuse within the voltage regulator, which has a slightly higher rating than the external fuse, opens and disables the excitation supply circuit, thereby positively shutting down the alternator. If the secondary fuse is opened, the voltage regulator may be replaced. Replacement of the voltage regulator however is less costly than a damaged alternator, load or the like.

More particularly in a preferred construction of the present invention, the permanent magnet generator supplies power to the exciter. The output of the permanent magnet generator is full wave rectified to provide D.C. excitation current to the exciter. The output of the magnet generator is also coupled to a separate rectifier network to provide a D.C. voltage supply to the voltage regulator for powering of the voltage regulator components independently of the output of the alternator. A current sensing resistor is connected in series with the rectified output of the permanent magnet generator and the excitation circuit. The voltage across the resistor is monitored and constitutes a first input to a multiple input logic circuit and particularly to a signal comparator. A voltage dividing network is connected to the regulated power supply and establishes a reference signal level which is connected to the second input of the comparator. The logic unit therefore monitors the level of excitation. If the excitation level rises about a selected maximum level indicating full-on excitation for a selected period and therefore abnormal operation of the voltage regulator, the comparator establishes a shut-down signal. The comparator is preferably an operational amplifier wherein a small differential at the signal inputs produces an essentially instantaneous switched logic signal. In a preferred construction, a second shut down signal is generated if over excitation condition is sensed and fails to turn off the regulator within a given period. The second and first signals are coupled to a logic gate, such as a NAND gate, to produce an output shut-down signal in either event. The output of the NAND gate is connected in multiple input latch circuit means to latch the circuit in an actuated state in response to actuation at either one of the inputs.

The latched control signal is connected to a special delayed circuit to energize the gate and fire the thyristor or other similar gated solid state device during each half cycle of rectified power supply from the permanent magnet generator.

The silicon thyristor is fired from a triggered oscillator and an interrelated voltage detection circuit is coupled to sense the rectified voltage across the thyristor. The voltage detection circuit positively prevents firing of the thyristor until the regulator voltage supply is at an appropriate value to insure conduction through the thyristor. The delay insures that the power supply to the regulator is maintained to insure continued operation of the voltage regulator and the presence of power to the safety portion or circuit. The oscillator is released and is a suitable oscillator to develop a high peak, narrow current pulse for driving the thyristor or other control device fully on.

The thyristor is connected into the series excitation circuit and in particular between the one side of an internal fuse in the voltage regulator and the common side of the supply to form a short circuit or "crowbar" directly across the rectifier of the permanent magnet generator. The short circuit will normally trip the protective device in series with the output winding of the generator and thus remove power from the exciter and therefore the alternator. If the main protective device is by-passed or does not trip for any reason, the internal fuse will trip and effect a similar shut down of the alternator. The fuse and associated regulator equipment is sealed within a suitable encapsulating material to prevent convenient access to the circuit components.

The present invention provides an inexpensive reliable means for insuring shut down of the alternator when the voltage regulator signals shut down of the alternator and for any reason the alternator excitation circuit is maintained and thereby provides improved safety for protection for the alternator, the load circuit and the like.

BRIEF DESCRIPTION OF DRAWING

The drawing furnished herewith generally illustrates the best mode presently contemplated for the invention and is described hereinafter.

In the drawing.

DESCRIPTION OF ILLUSTRATED EMBODIMENT

Figure 1:
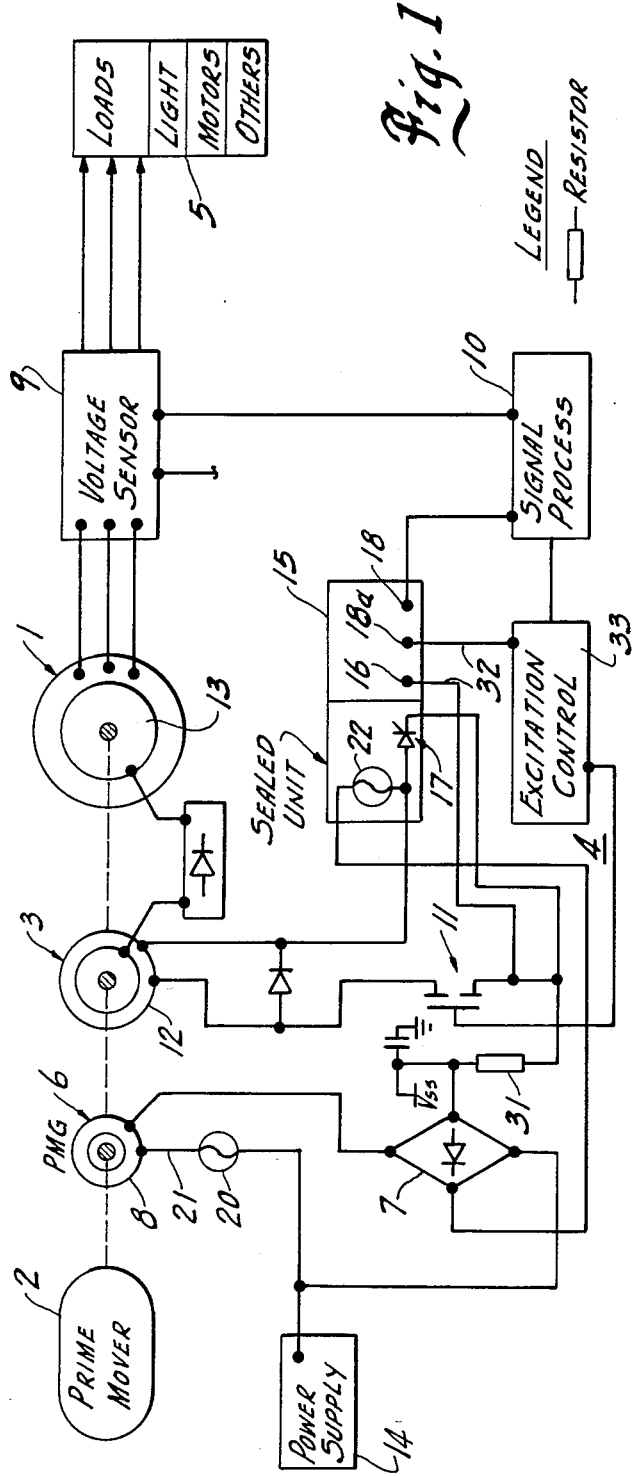
FIG. 1 is a block diagram of a control circuit of a regulated alternator incorporating the present invention.

Referring to the drawing and particularly to FIG. 1, an alternator 1 is illustrated with a rotating field construction. The alternator 1 is driven by suitable prime mover 2 such as an internal combustion engine or the like. An exciter 3 is coupled to the alternator and the prime mover 2 and provides a D.C. current output connect to the alternator field for exciting thereof. A voltage regulator 4 is connected for regulating the level of the output of the exciter 3 and thereby the excitation and output of the alternator 1 for providing a regulated voltage to the interconnected loads 5, such as shown for example in applicant's co-pending application entitled "Alternator Voltage Regulator With Special Responsive Control", filed on the same date as this application.

A permanent magnet generator 6 is also coupled to the alternator 1. A full wave bridge rectifier 7 is connected to the generator stator winding 8 and provides a power supply for the voltage regulator 4 and for the exciter 3. The level of the exciter excitation is controlled by the voltage regulator 4 to thereby control the excitation and output of the alternator 1. A voltage sensor 9 is shown coupled to the output of the alternator 1 and provides an alternator voltage output related signal. This signal is processed by signal processing circuit 10 and coupled as the input to the voltage regulator 4 and controls a variable drive circuit 11 connecting the exciter field winding 12 in series with the output of the rectifier 7. The drive circuit 11 of the regulator 4 thus has its output varied to correspondingly control the energization of the exciter field. The output of the exciter 3 is rectified and provides a corresponding variable D.C. energization of the field 13 of the alternator 1. If the voltage deviates from a selected range of values the regulator drives the excitation to change the voltage to the desired regulated level. The voltage regulator 4 and the excitation as noted is connected to the permanent magnet generator 6 as the power supply. The output of the permanent magnet generator 6 is rectified by a full wave rectifier 7 and provides an appropriate D.C. current supply for the exciter field winding 12 and to the logic circuit of regulator as shown at 14.

The regulator 4 incudes a regulator or power failure detection unit 15 which includes a first input 16 which monitors the current in the exciter winding 12 and which may actuate a "crowbar" or short circuit thyristor 17 connected across the output of the rectifier 7 if the current rises to the selected level. The illustrated detection unit 15 further includes regulator status inputs including an output drive signal monitor input 18 and an over excitation monitor input 18a for firing the thyristor if the output drive is zero or the over excitation has tripped and current is present in the field winding 12. Thus if either of the input signals at terminals 18 or 18a indicates the field current should be zero, but the input 16 indicates the presence of field current, the detection unit 15 produces a signal to fire the crowbar thyristor 17. This creates a short circuit condition and draws a corresponding current from the permanent magnet generator 8 through the leads to rectifier 7. A protective device 20, shown as a simple fuse, is connected in series in the one main output power lead 21 of the gnerator 6. When the short circuit is created by the crowbar thyristor, the fuse 20 will rapidly trip, open the power supply to the exciter and shut down the alternator 1. Fuse 20 is normally a current device which opens by disruption of a heat responsive element. The terminology fuse and fuse means is used herein to generically define any device to effectively open the circuit and reduce the excitation level to a safe level, thus various switch means and impedance means may be used to provide the necessary limiting of a current supply and function to effectively open the circuit and produce the desired operative disabling of the alternator operation.

In the illustrated embodiment, a secondary protective device 22 also shown as a fuse is connected in series with the crowbar circuit. Fuse 22 will be tripped, if the fuse 20 has been by-passed or fails to trip for any reason. The fuse 22 is mounted as a part of the regulator package, which is generally a potted unit, such that the operator does not have access to fuse 22. The double fused system thus permits normal control and servicing of the first external fused system, while positively maintaining the protective response in the event of tampering or malfunctioning of such external fused system.

Figure 2:
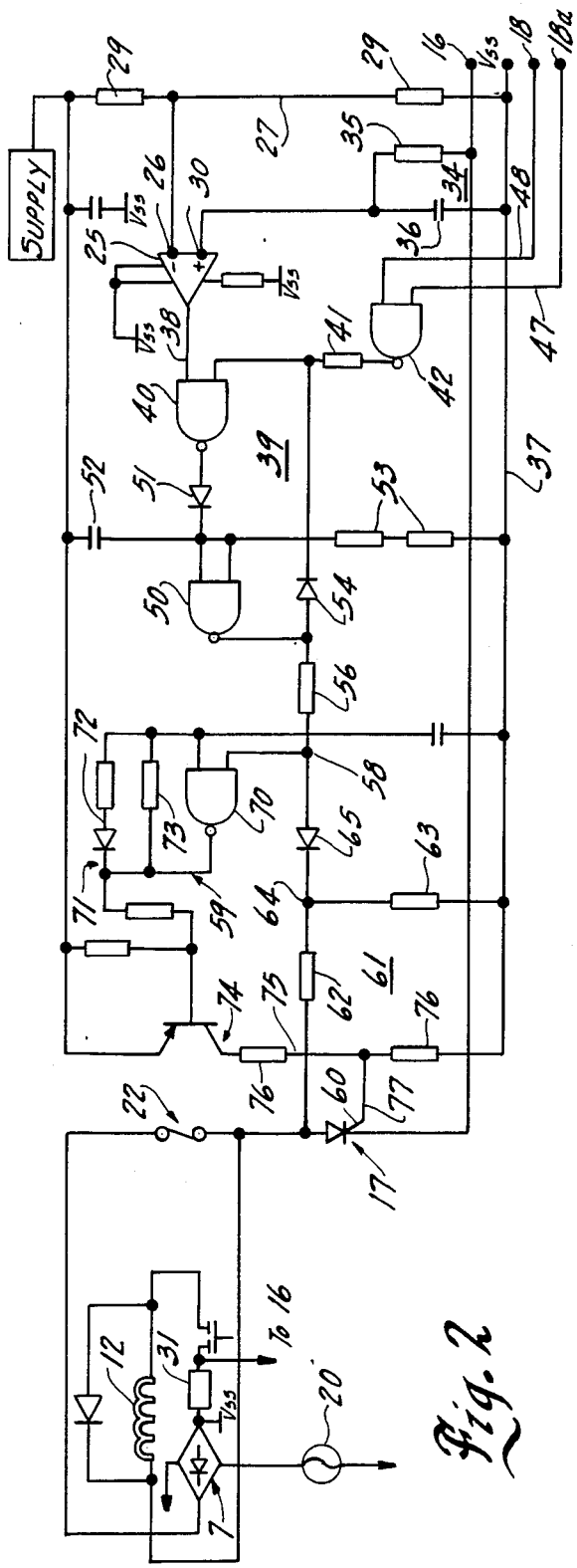
FIG. 2 is a schematic circuit diagram more clearly illustrating the circuit of FIG. 1.

A preferred circuit for the detection unit 15 is shown in FIG. 2.

Referring particularly to FIG. 2, a signal comparator 25 shown as a high gain operational amplifier has its negative input terminal 26 connected to a reference voltage branch circuit 27 coupled to and driven from the fixed regulated power supply 14. The circuit 27 is a voltage dividing circuit having series connected resistors 29, with the voltage at the common connection connected to the input 26. The second input 30 of the operational amplifier 25 is connected to the excitation current monitor line 16. The excitation circuit includes a series sensing resistor 31. An exciter signal line 32 connected to the excitation monitoring circuit 33 provides an overexcitation signal to terminal 18a. The line 16 is connected to the one side of the sensing resistor 31. The voltage signal line 16 is connected in circuit through a timing network 34, consisting of a series coupling resistor 35 and a capacitor 36 to reference or ground common reference or ground 37. The network 34 eliminates transient signals by holding the output signal low until the capacitor 36 charges to the threshold level. The capacitor-resistor node is connected to the positive input 30 of the operational amplifier 25. As the signal at terminal 30 rises above the reference level signal at terminal 26, the output of the amplifier switches essentially instantaneously to provide a step or logic signal change at the output line 38 of the comparator amplifier. Thus, the high gain amplifier 25 produces a switching action at its output in response to a small differential at the input.

The output 38 is connected to a latch circuit 39 which includes a two-input NAND gate 40. The one input of gate 40 is connected to the output line 38 of the comparator amplifier 25. The other input is connected in series with a resistor 41 to a status integrity circuit 42 connected to the interrelated inputs 18 and 18a. The integrity circuit consists of a two input logic unit 42 also shown as a dual input NAND gate. The one input of the NAND gate 42 is coupled to the over-excitation output of the excitation processing circuit by line 32 to terminal 18a and the second input is connected to the error voltage and demand signal via the line 48 to the terminal 18.

The output of the NAND logic gate 42 is therefore a positive signal when either a low drive signal or an overexcitation signal is detected, each of which would signal that the exciter current should be zero. Thus, if either signal is low, the signal will cause the output of gate 42 to go high and provide a corresponding input to the NAND gate 40 of the coupling latch circuit 39. Thus, the multiple inputs each monitor an operating function of the voltage regulator and provide an appropriate firing input to the coupling latch circuit when excitation current should be zero but in fact is not.

The latch circuit 39 includes the two input NAND gate 40, a Schmitt NAND gate 50 connected as an inverter which is connected to the output of the first NAND gate in series with a blocking diode 51. A capacitor 52 in series with timingg resistors 53 is connected across the logic voltage supply. The capacitor 52 is normally fully charged as the result of the connection to the output of the gate 40 via the diode 51. When a logic signal is received, the capacitor 52 will charge through resistor 53 to the zero voltage rail 37 from the previously high voltage from the NAND gate 40 coupled through the diode 51. The charging of capacitor 52 introduces a time delay, for example, typically 1.5 seconds, to avoid nuisance tripping. The output of the second NAND gate 50 is fed back through a coupling diode 54 to the input of the input NAND gate 40 and particularly in common with the integrity signal, to latch in the latch circuit 39 in response to initial firing of the circuit.

The output of the NAND gate 50 is also connected through a series resistor 56 to a pulse forming unit, shown as a Schmitt-trigger oscillator 59. The voltage at the input node 58 thus rises after a selected rate. Generally, a time constant of approximately 1½ seconds has been used in a practical alternator control system. The signal at node 58 is applied to the Schmitt-trigger oscillator 59 to generate a series of triggering pulses coupled to the gate 60 of thyristor 17. A main terminal voltage monitor or detector circuit 61 monitors the voltage across the main terminals of the thyristor to limit the firing of the thyristor and collapsing of the output of the generator before the fuse is activated. The circuit 61 includes a pair of series connected resistors 62 and 63 connected directly in parallel from the rectifier node to the common supply line 37. The common node or junction 64 of the voltage dividing resistors 62 and 63 is connected to the input to the oscillator 59 in series with a blocking diode 65. Thus, until the voltage level at the node 64 rises to a selected level, the input to the Schmitt-trigger is clamped to the voltage established by the voltage dividing network 61. The special voltage established by the voltage dividing network is selected to require an anode voltage at which a short high drive pulse on the gate 60 of the thyristor will insure full conduction and turn on of the thyristor, whereby it will be maintained operational for the completion of each positive half cycle and the anode is held above the critical voltage independently of the continuation 20 of the current at the gate 60. Also this maintains sufficient supply voltage to power the regulator signal circuitry.

The Schmitt-triggered oscillator 59 is shown including a NAND logic gate 70 with appropriate resistive feedback network 71 to produce a sharp signal pulse. A timing control branch 72 in the feedback network consisting of a resistor and a forward biasd diode connects the input to the output of the NAND circuit. The control branch is selected in relationship to the parallel feedback resistor 73 to establish and maintain a much shorter cycle time during the low logic output of the triggered oscillator in relationship to the high output signal. The result is a low average gate current but with a very high peak. This ensures good firing for the high current surge through the rectifier.

The narrow pulse output signal of the oscillator 59 is connected to drive a transistor 74 and thereby complete a circuit in a gate branch circuit 75. The gate branch circuit 75 includes an appropriate voltage dividing resistor 76 in series with the transistor 74, with the output of the voltage dividing network connected to the gate 60 of the thyristor by the connecting lead 77.

In summary, when a trigger signal is established by the comparator 25 and the latch circuit 39 is set, a shutdown logic signal is maintained and transmitted via the time delay circuit including capacitor 52 to the oscillator 59 and the voltage detector 61. When the voltage output to the exciter rises to the threshold level, the diode 65 is back biased and the oscillator 59 is driven on to generate a high pulse signal turning on the transistor. A sharp narrow current pulse is generated and passes through the gate-to-cathode circuit of the thyristor, firing the same and directly connecting of the fused line to one side of the rectifier via the reference signal line of terminal 16, and output side of the bridge 7. This establishes a typical crowbar circuit, which includes the series connected fuse 22. Large current flows through the main fuse 20 to readily open the fuse and thereby affectively open the power supply to the excitation circuit resulting in a rapid shut down of the alternator 1. If fuse 20 does not trip, fuse 22 will trip, to protect the alternator and the loads. Generally, the fused system will shut down the alternator, but any other control or information and output means might be actuated to permit control of the same, if desired. The present invention thus provides a reliable and effective means to protect the alternator from operating with a faulty regulator or with an inconsistent control signal.

Various modes of carrying out the invention are contemplated as being within the scope of the following claims particularly pointing out and distinctly claiming the subject matter which is regarded as the invention.

I claim:

1. A protective circuit having a fuse means connected in circuit with a supply means of a regulator means for controlling the operation of an alternator, comprising sensing means to sense the state of the alternator operation and to sense the related demand for alternator operation, control means connected in series with said fuse means to actuate said fuse means to protect said alternator operation, said alternator including an excitation control means for controlling the output of the alternator and establishing a demand for excitation current, said sensing means sensing the demand for excitation current and sensing the acutal presence of excitation current, an excitation power supply connected in series with said fuse means, and said control means includes logic means coupled to said sensing means and operable in response to the presence of excitation current with said demand for excitation current essentially zero, a switch means operable to connect said fuse means directly across said power supply to thereby open said power supply connection to said excitation means and said logic means connected to actuate said switch means.

2. The protective circuit of claim 1, wherein said sensing means includes first means to sense the presence of current excitation, second means to sense a zero excitation demand, and third means to sense an over excitation state, and logic means connected to said first, second and third means and operable to actuate said switch means in response to an output from said first means and an output from either said second or third means.

3. The protective circuit of claim 1, wherein said switch means is a solid state switch, said power supply means is a full wave rectified supply and said solid state switch conducts only in the presence of a minimum impressed voltage, and means to monitor the impressed voltage on said switch and preventing turn-on of said switch in the absence of said minimum impressed voltage.

4. A protective circuit having a fuse means connected in circuit with a supply means of a regulator means for controlling the operation of an alternator, comprising sensing means to sense the state of the alternator operation and to sense the related demand for alternator operation, means connected to said sensing means and establishing a control signal in response to the sensing of the simultaneous presence of excitation current and an opposite demand signal indicating the excitation current should not be present, and control means connected in series with said fuse means to actuate said fuse means to protect said alternator operation, said regulator means includes a sealed support means, a secondary fuse means within said sealed support and connected in series with said control means and operate in response to a failure of said first-named fuse means to respond.

5. A safety crowbar circuit for an alternator having an excitation circuit connected to a supply means and a regulator means having input means to sense the operation of the alternator and generate a demand for excitation current, comprising a voltage regulator fuse means for connection in series with said excitation circuit, sensing means to sense the state of the excitation current and the demand for excitation, means connected to said sensing means and establishing a shut down logic signal in response to the simultaneous presence of excitation current and a zero current excitation current demand signal, an electronic solid state crowbar switch connected in series with said voltage regulator fuse means directly across the excitation supply means to short circuit said supply means and establish a high pulse current through said fuse means to terminate the excitation of said alternator.

6. The safety crowbar circuit of claim 5, wherein said sensing means includes first means to sense the presence of current excitation, second means to sense a zero excitation demand, and third means to sense an overexcitation state, and logic means connected to said first, second and third means to actuate said crowbar switch in response to an output from said first means and an output from either the second or third means.

7. The safety crowbar circuit of claim 5, wherein said regulator means includes a sealed support, a secondary fuse within said sealed support and connected in series with said crowbar switch to open said excitation circuit in response to a failure of said firstnamed fuse means to respond.

8. The safety crowbar circuit of claim 5, wherein said regulator means and said excitation circuit are connected to a full wave rectified supply and said solid state crowbar switch conducts only in the presence of a minimum impressed voltage, and means to monitor the impressed voltage on said switch and preventing turn-on of said switch in the absence of said minimum impressed voltage.

9. The safety crowbar circuit of claim 5, including a generator, an exciter for said alternator, a full wave rectifier connected to said generator to supply alternator excitation power, said fuse means being a series fuse connected in series with said generator, a voltage regulator connected to establish a demand signal for regulating said alternator, an exciter power supply circuit, connection means for connecting said exciter power supply circuit to said exciter and including a second fuse in series in said connection means and having an exciter level control means, output sensing means adapted to be coupled to said alternator and to said regulator and providing a variable signal to energize said exciter level control means to maintain the output of said alternator in a predetermined states, and a thyristor connected across said full wave rectifier in series with said second fuse and operable to establish a short circuit across said rectifier.

10. The safety crowbar circuit of claim 9, wherein said sensing means includes a current sensor connected in series in said connection of said exciter power supply circuit to said fused exciter lines and generating a related voltage signal, an overexcitation signal sensor coupled to the exciter and generating a shut-down signal in response to a predetermined excitation level, a logic signal comparator connected to said regulator to sense the presence of said demand signal and to said current sensor to sense excitation current and to said over-excitation signal source and operable to actuate said thyristor and establish a short circuit current through said fuse means.

11. The safety circuit of claim 9, wherein said alternator includes an exciter current control means and said sensing means includes output sensing means adapted to be coupled to said alternator and connected to regulator for providing a variable signal to energize said exciter current control means to maintain the output of said alternator in a predetermined state, a current sensor connected in series in said connection of said exciter power supply to said fused circuit, said current sensor generating a related voltage signal, an excitation current limit detector coupled to said alternator and generating a signal proportional to excitation current above a selected level, a high gain switching amplifier connected as a high gain switching device and including a negative input connected to a low current threshold reference and having a positive input, a timing circuit connecting said positive input to said excitation current sensor and operable to switch said high gain switching amplifier thereby generating a first shut-down control signal, a two-input logic gate having a first input connected to said current limit detector to sense an over excitation current and said second input connected to said demand signal sensor and establishing a signal in response to a corresponding logic signal at either one of the inputs of said logic gate, a latch circuit connected to the two-input logic gate, a filter network connected to the output of the latch circuit to remove transient signals and delay the effective output for a predetermined momentary period, a pulse forming means developing a pulse train consisting of a high amplitude and narrow pulses, a driving circuit coupling the output of said pulse forming means to the gate of said thyristor for turning said thyristor on and establishing a short circuit across the output of the exciter rectifier in series with said first fuse.

12. The safety circuit of claim 11, including a voltage detection circuit connected to said thyristor and establishing a voltage proportional to the applied voltage, means connecting said voltage detection circuit to the input of the said pulse forming means to clamp the input off until said impressed voltage rises to a pre-selected voltage and at that point releasing said pulse forming means to generate said turn on pulse and drive said thyristor into full conduction, said selected voltage being selected to insure complete turn on of the thyristor and to maintain the logic supply voltage for a sufficient period to insure operation of the safety circuit.

13. The safety circuit of claim 11, having an alternating current power supply, a rectifier for converting said power supply to a rectified direct current, said fuse means being connected in series between said power supply and said rectifier, said rectifier having an output means, a second fuse connected in series with said output means and said excitation circuit, said thyristor being connected in series with said second fuse directly across said rectifier.

14. The safety circuit of claim 5, having an alternating current power supply, a rectifier for converting said power supply to a rectified direct current, said fuse being connected in series between said power supply and said rectifier, said rectifier having an output means, a second fuse connected in series with said output means and said excitation circuit, said crowbar switch being connected in series with said second fuse directly across said rectifier.

15. A voltage regulator system having a permanent magnet generator providing excitation power to an exciter for energizing the field of an alternator, comprising supply lines including a series connected fuse connected to said generator, said fuse being operable to open said supply lines in the presence of an abnormal current flow from the generator, a full wave bridge rectifier connected to said fused supply lines and establishing a D.C. exciter supply signal, a voltage regulator connected to establish a demand signal for regulating said alternator, a D.C. logic power supply connected to said supply lines for providing logic power to said voltage regulator, an exciter circuit, a connection means for connecting said exciter power supply to the exciter, a second fuse in series with said connection means and having an exciter level control means, sensing means adapted to be coupled to said alternator and to said regulator and providing a variable signal to energize said exciter level control means to maintain the output of said alternator in a predetermined states, a thyristor connected across said full wave rectifier in series with said second fuse and having a gate operable to turn on said thyristor and establish a short circuit across said rectifier, a current sensor connected in series with said connection means of said exciter power supply and generating a related voltage signal, an overexcitation signal sensor coupled to the exciter and generating a shut-down signal in response to a predetermined excitation level, a logic signal comparing means connected to said regulator to sense the presence of said demand signal and to said current sensor to sense excitation current and to said overexcitation signal source and operable to actuate said thyristor and establish a short circuit current through said fuse means.

16. The voltage regulator system of claim 15, wherein said regulator means includes a sealed housing for said exciter level control means and said thyristor, a second fuse means within said sealed housing and connected in series with said thyristor.

17. The voltage regulator of claim 15, having a voltage detection means connected across said thyristor and operable to hold said signal comparing means off until the voltage and said thyristor insures turn-on of the thyristor.

18. A voltage regulator system for a separately excited alternator having a rotating field, comprising an independent power supply, exciter power supply lines connected to said power supply and including a fuse for opening the supply circuit in the presence of an abnormal current flow from the power supply, a full wave bridge rectifier having an input connected to said fused supply lines and establishing a D.C. exciter supply current, a voltage regulator having a variable exciter current control for connecting said exciter power supply lines to the said exciter and including a second fuse in series with said connection, a logic power supply connected to said power supply for providing logic power to the voltage regulator sensing means adapted to be coupled to said alternator and connected to said regulator for providing a variable demand signal to energize said exciter current control means to maintain the output of said alternator in a predetermined state, a current sensor connected in series in said connection of said exciter power supply to said exciter, said current sensor generating a related voltage signal, overexcitation voltage means generating a signal in response to a selected overexcitation voltage, a high gain operational amplifier connected as a high gain switching device and including a first input connected to a low current threshold reference and having a second input, a timing circuit connecting said second input to said current sensor and operable to switch said high gain amplifier and thereby generating a first shut-down signal, a two-input logic gate having a first input connected to said overexcitation detector to sense an overexcitation voltage and said second input connected to receive said demand signal and establishing a signal in response to a corresponding second shut-down signal at either one of the inputs of said logic gate, a latch circuit including a second two-input logic gate connected respectively to the output line of the high gain amplifier switch and said first two-input logic gate, said latch including a feedback diode to the one input of said second twoinput logic gate to latch said gate in the triggered position in response to shutdown signals at both inputs of said second two-input latch, and a thyristor connected in series with said second fuse across bridge rectifier and having a gate, and a pulse forming circuit connected to said latch and to said gate thyristor for turning said thyristor on.

19. The voltage regulator system of claim 18, having the time delay network connected to the latch circuit to remove transient signals and delay the effective output for a predetermined momentary period, said pulse forming circuit including a Schmitt-triggered oscillator including a feedback netowrk developing a pulse train consisting of a high amplitude and narrow pulses, a driving circuit coupling the output of said Schmitt-triggered oscillator to the gate of said thyristor for turning said thyristor on and establishing a direct short circuit across the output of the rectifier in series with said fuse.

20. The voltage regulator of claim 19, having a voltage detection circuit connected across said thyristor and establishing a voltage proportional to the applied voltage, means connecting said voltage detection circuit to the input of the said Schmitt-trigger oscillator to clamp the input off until said applied voltage rises to a pre-selected voltage and at that point releasing said Schmitt-triggered oscillator to generate said turn-on pulse and drive said thyristor into full conduction, said selected voltage being selected to insure complete turn-on of the thyristor and to maintain the logic supply voltage for a sufficient period to insure operation of the protective circuit.

* * * * *

UNITED STATES PATENT AND TRADEMARK OFFICE
CERTIFICATE OF CORRECTION

PATENT NO. : 4,764,838
DATED : August 16, 1988
INVENTOR(S) : ALISTAIR A. MAC FARLANE It is certified that error appears in the above-identified patent and that said Letters Patent is hereby corrected as shown below:

Claim 1, col. 7, line 45, delete "acutal" and substitute therefor ---actual---; Claim 7, col. 8, line 50, delete "firstnamed" and substitute therefor ---first-named---; Claim 9, col. 9, line 6, delete "states" and substitute therefor ---state---; Claim 11, col. 9, line 26, after the second occurrence of "to" insert ---a---; Claim 15, col. 10, line 40, delete "states" and substitute therefor ---state---; Claim 17, col. 10, line 60, after "regulator" insert ---system---; Claim 18, col. 11, line 4, after "and" insert ---an output---; Claim 18, col. 11, line 10, after "regulator" insert ---,---; Claim 18, col. 12, line 2, delete "twoinput" and substitute therefor ---two-input---; Claim 19, col. 12, line 14, delete "netowrk" and substitute therefor ---network---

Signed and Sealed this

Fourteenth Day of November, 1989

*Attest:*

JEFFREY M. SAMUELS

*Attesting Officer*     *Acting Commissioner of Patents and Trademarks*